United States Patent [19]

Bottum

[11] Patent Number: 5,167,128
[45] Date of Patent: Dec. 1, 1992

[54] SUCTION ACCUMULATOR AND FLOOD CONTROL SYSTEM THEREFOR

[76] Inventor: Edward W. Bottum, c/o Refrigeration Research, Inc. 525 N. Fifth St., P.O. Box 869, Brighton, Mich. 48116-0869

[21] Appl. No.: 775,585

[22] Filed: Oct. 15, 1991

Related U.S. Application Data

[63] Continuation of Ser. No. 597,084, Oct. 15, 1990, Pat. No. 5,076,066.

[51] Int. Cl.$^5$ .............................................. F25B 41/00
[52] U.S. Cl. ...................................... 62/174; 62/503; 62/188; 62/220
[58] Field of Search ................. 62/503, 126, 129, 188, 62/220, 221, 174; 137/202

[56] References Cited

U.S. PATENT DOCUMENTS

3,837,177  9/1974  Rockwell .............................. 62/503
4,757,696  7/1988  Gannaway .............................. 62/503

Primary Examiner—John Sollecito
Attorney, Agent, or Firm—Bertram F. Claeboe

[57] ABSTRACT

The present invention is directed to a system for avoiding possible compressor damage occasioned by major flood back of the suction accumulator in a refrigeration system. In one embodiment of the invention, a float member slides upwardly and downwardly upon the stand pipe of the accumulator in response to the level of refrigerant therein, and when the refrigerant rises to a critical level, the float member is effective to block the outlet openings in the upper end of the suction accumulator, preventing flow of refrigerant to the compressor sufficient in volume to cause damage thereto. In another embodiment of the invention, a float member having magnet means associated therewith moves vertically in opposite directions upon a tubular support connected to the suction accumulator structure. Magnetic switch means associated with the tubular support member is actuated by the float member magnet means when in proximity thereto, effecting by various means termination of refrigerant flow to the compressor sufficient in volume to cause damage thereto.

4 Claims, 2 Drawing Sheets

SUCTION ACCUMULATOR AND FLOOD CONTROL SYSTEM THEREFOR

This is a continuation of application Ser. No. 07/597,084 filed Oct. 15, 1990 now U.S. Pat. No. 5,076,066.

BACKGROUND OF THE INVENTION

It is known in the art to which this invention pertains to provide a suction accumulator between the evaporator and compressor of a refrigeration system in order to protect the compressor from possible damage. Vaporized refrigerant is received from the evaporator and passed on through the suction accumulator to the compressor. Any raw liquid is metered back to the compressor by the accumulator at a rate that will not result in damage to the compressor.

During operation of the refrigeration system, there are times when an unusual amount of refrigerant will collect in the suction accumulator. For example, when the system is shut off, such as in the case of an intermittently operated air conditioning system, the refrigerant tends to condense in the entire system and collect in the accumulator. A similar situation may occur when the system is operated under low load conditions. Generally speaking, in the situations described, the metering orifice in the lower end of the stand pipe of the suction accumulator is quite adequate to assure that liquid refrigerant is delivered to the compressor at a non-harmful rate.

Unforeseen circumstances may arise, however, which cause what is termed in the art a "major flood back" of the accumulator. Stated otherwise, in this situation the liquid level capacity of the suction accumulator, or its design limit, is exceeded. To explain further, an accumulator is normally sized as to holding capacity to store only that percentage of refrigerant charge as will not cause damage to the compressor. This may vary from 25 to 75 percent of the total charge. Should this volume be exceeded by a major flood back, which illustratively may be caused by failure of the expansion valve in the refrigeration system, damage to the compressor may result.

SUMMARY OF THE INVENTION

Applicant has discovered that by provision of buoyant means interiorly of a suction accumulator responsive to the level of liquid refrigerant therein and controllable along a predetermined ascent path is effective to essentially entirely terminate refrigerant flow to the compressor until corrective action can be taken. The novel float means of this invention may take various forms, and in one embodiment there is provided a passaged globular body vertically slidable upon the stand pipe or outer suction tube of a suction accumulator, and effective to close outlet openings at the upper end of the stand pipe, when the refrigerant level in the accumulator is at that point creating likelihood of compressor damage.

In another embodiment of the invention, a passaged metal sphere having magnet means associated therewith is vertically slidable upon a tubular member connected to accumulator structure, the tubular member having removably associated therewith magnetic switch means actuated when the metal sphere rises in response to a level of refrigerant in the accumulator likely to cause damage to the compressor.

DESCRIPTION OF A PREFERRED EMBODIMENT

Figure 1:
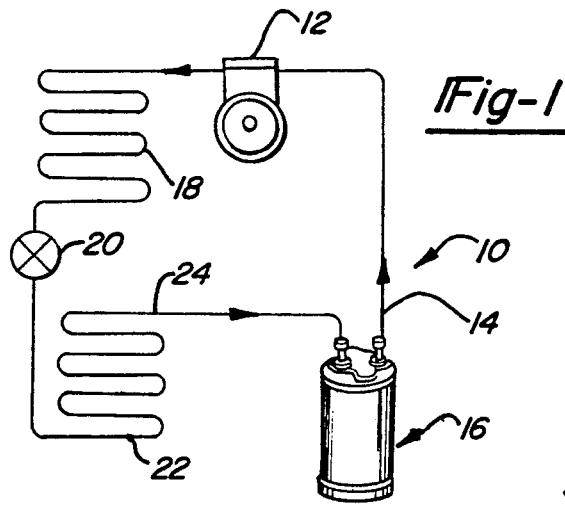
FIG. 1 is a schematic diagram of a refrigeration system embodying a suction accumulator to which the present invention is directed.

Referring now first to FIG. 1 of the drawings, a conventional refrigeration system 10 is shown, the system being charged with a refrigerant material. As is normal, compressor 12 receives gaseous refrigerant through suction conduit means 14 from suction accumulator 16, the gaseous refrigerant is compressed, and passes to condenser 18. The refrigerant is condensed to a liquid state at 18, and passes through expansion valve 20 whereat its temperature and pressure are reduced. The cooled refrigerant then passes to evaporator 22, wherein it is vaporized by absorbing heat and then enters suction accumulator 16 through conduit means 24.

Figure 2:
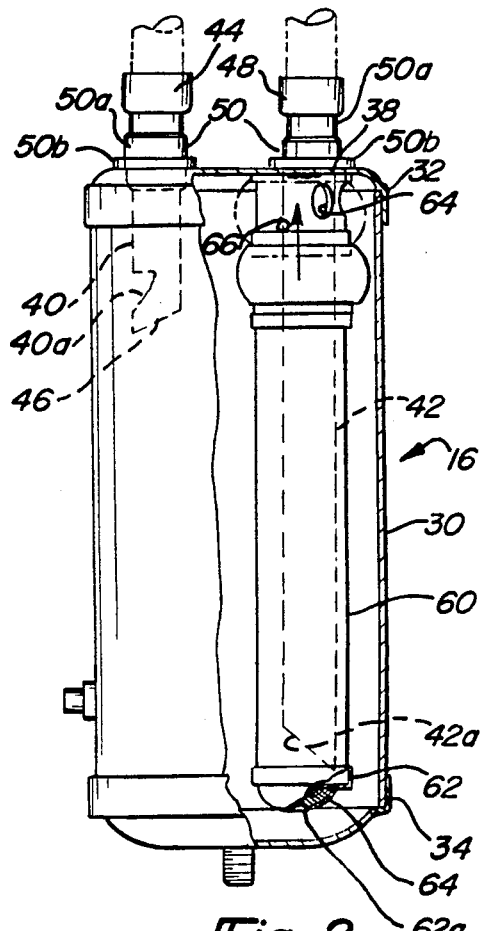
FIG. 2 is a side elevational view of a suction accumulator, a portion thereof being broken away to show one form of flood control means of this invention.
Figure 3:
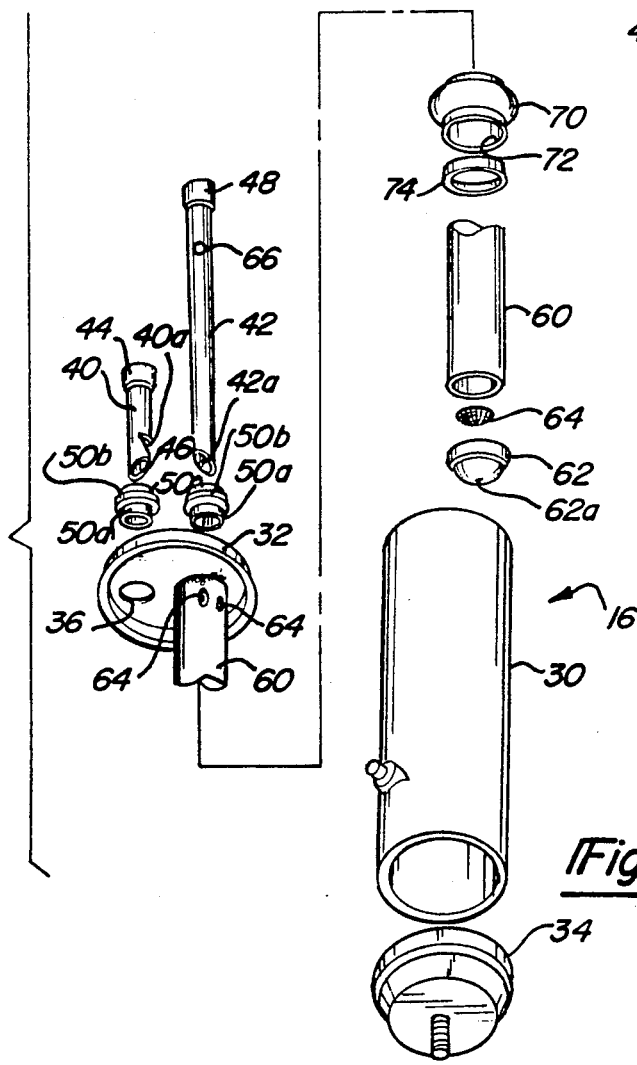
FIG. 3 is an exploded perspective view illustrating one sequence of steps in assembling the present suction accumulator.

Suction accumulator 16 is shown in detail in FIGS. 2 and 3, and reference is now made thereto. The suction accumulator 16 comprises a generally cylindrical shell or casing 30 to which at opposite ends are brazed cap or closure means 32 and therethrough inlet tube 40 and outlet tube 42, respectively. A metal tag (not shown) may be secured to cap means 32 to prevent reverse connection of the suction accumulator 16, thereby avoiding damage to the compressor 12.

Support for the copper inlet tube 40 and copper outlet tube 42 within the openings 36 and 38, respectively, are bushing means 50. The bushing means 50 is formed to include a tubular main body portion 50a and integral larger diameter central or ring portion 50b. During installation, after being seated in the top cap openings 36 and 38, the lower or inner end of each of the bushing means 50 is flared against the inner surface of the top cap or closure 32 to fixedly secure the same thereto.

Copper inlet tube 40 may mount at one end copper nipple means 44, or in the alternative, may be expanded. The opposite end of the inlet tube 40 adjacent the bottom thereof has an opening notch 40a forming baffle 46 therein for deflecting gaseous phase change material from inlet tube 40 into shell or casing 30 adjacent the top thereof.

Copper outlet tube 42 may mount at one end copper expanded quill means 48, while the opposite end of tube 42 is beveled as at 42a. Outlet tube 42, on occasion referred to as an inner suction tube, is received within stand pipe 60, sometimes termed an outer suction tube. As appears in FIGS. 2 and 3, outlet tube 42 is of lesser diameter than stand pipe 60, thereby providing considerable unoccupied space within the stand pipe for the flow of gaseous material therethrough.

The stand pipe or outer suction tube 60 is commonly 32 and 34. Brazing is the preferred method for securing the upper end of stand pipe 60 to the underside of cap means 32, and for fixedly attaching cap means 32 and 34 to casing 30. The lower or opposite end of the stand pipe 60 fixedly mounts cap means 62 centrally apertured at 62a to provide a small metering orifice. If desired, a small mesh screen 63 may be spot welded over the hole or opening 62a to prevent the plugging thereof.

Stand pipe 60 at the end thereof affixed to cap means 32 is provided with a plurality of circumferentially spaced holes or openings 64, best shown in FIG. 3 as spaced a relatively small distance axially inwardly of the extreme end of the stand pipe. The normal function of the openings 64 is to direct the passage of refrigerant gas between the inlet tube 40 and upper end of the stand pipe 60. However, as will shortly be explained in detail, the holes 64 in combination with the flood control means of this invention, assure that should a major flood back of the suction accumulator occur, refrigerant flow of a volume sufficient to cause compressor damage will be effectively prevented.

With further reference particularly to FIG. 3, outlet tube 42 at the upper end thereof is provided with a vent opening 66 therein. This serves to equalize the pressure within the outlet tube 42 and stand pipe 60 during the "off cycle".

The preceding steps in the assembly of a suction accumulator are more fully disclosed in my pending application Ser. No. 07/562,336 filed Aug. 3, 1990, now U.S. Pat. No. 5,075,967 and reference is made thereto.

In the embodiment of the invention shown in FIGS. 2 and 3, flood control means designated by the numeral 70 preferably takes the form of a sphere or globular body so constructed as to be buoyant with the rise or fall of refrigerant with the suction accumulator 16. The flood control means 70 may be fabricated of a wide variety of materials exemplified by brass, copper, steel, or plastics compatible with known refrigerants.

Having in mind buoyancy as a feature of the flood control means 70 of this invention, the device provided by applicant is of relatively thin wall construction, and essentially functions as a float valve, opening and closing the holes or openings 64 in the stand pipe 60. The flood control means 70 has a central axial passage 72 therethrough, sized in diameter relative to the outer diameter of the stand pipe 60 so as to be in smooth or loose-fitting slidable relation therewith. If desired, a ring member 74 may be affixed to the stand pipe 60 adjacent the lower end in encircling relation therewith, limiting the vertical downward travel of the flood control means 70.

It is believed now apparent that should a major flood back of the suction accumulator 16 occur, illustratively by a failure of the expansion valve 20 in the conventional refrigeration system 10 of FIG. 1, the flood control means 70 will be caused to rise, traveling vertically upwardly along and upon the stand pipe 60 until the control means 70 blocks or closes the stand pipe openings 64. Under this condition, no amount of refrigerant sufficient to cause damage to the compressor 12 will flow through conduit means 14.

Figure 4:
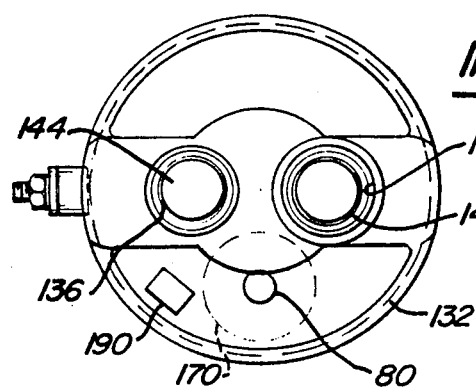
FIG. 4 is a top plan view of a suction accumulator incorporating another form of applicant's invention.
Figure 5:
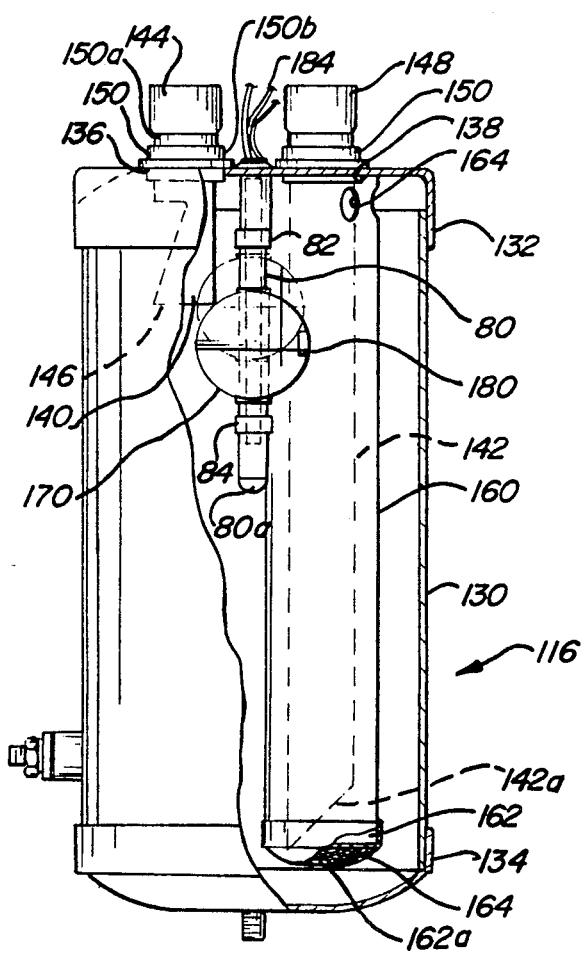
FIG. 5 is a side elevational view of the accumulator of FIG. 4, a portion thereof being broken away for purposes of showing in detail this form of the invention.
Figure 6:
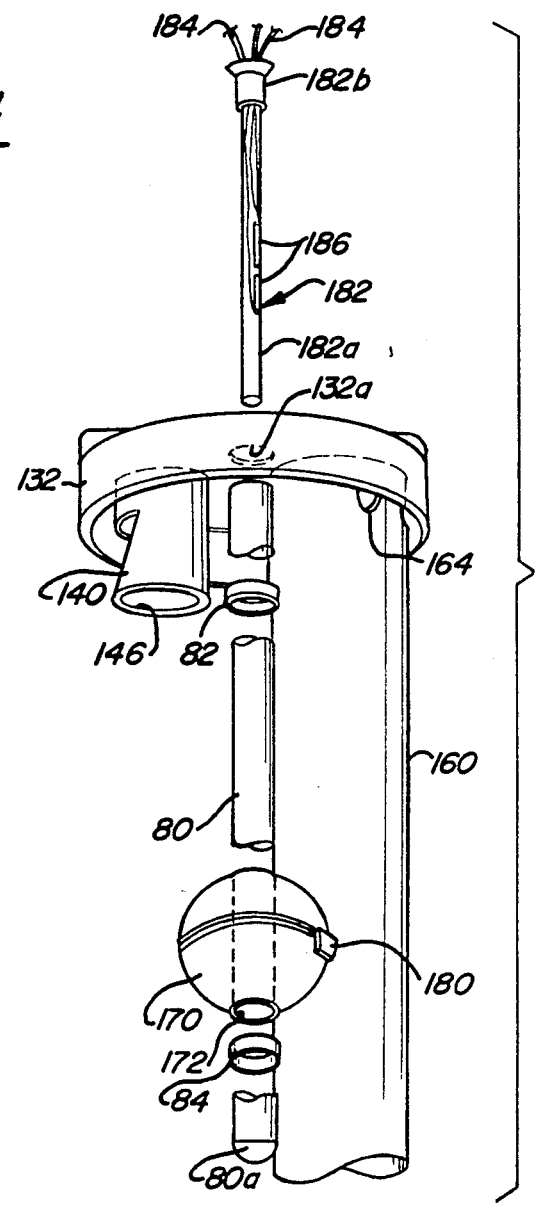
FIG. 6 is an exploded perspective view of this same form of the present invention.

Another embodiment of applicant's invention is shown in FIGS. 4, 5, and 6, and reference is now made thereto. Since suction accumulator 116 shown therein incorporates like parts substantially identical to those appearing in FIGS. 2 and 3, like numerals from the latter two views have been applied to like parts in FIGS. 4, 5 and 6, raised by the numeral "100".

The flood control structure provided by applicant and hereinabove described with reference to FIGS. 2 and 3 features the novel concept of causing a buoyant member to rise in response to the liquid level in a suction accumulator, and when the liquid reaches a critical level therein > openings in the accumulator are essentially entirely closed, and thereby potentially damaging liquid flow to the compressor is effectively terminated.

A float member which rises and falls in response to the refrigerant level in a suction accumulator is also one of the features of the flood control system illustrated in FIGS. 4, 5 and 6. However, in the system now to be described in detail, a magnetically activated switch arrangement is provided which is effective to issue a warning signal upon occurrence of a flood back condition, or if desired under such circumstances, to deactivate the compressor.

Referring now particularly to FIGS. 5 and 6, float member 170 is essentially spherical in shape in the manner of the globular body 70 of FIGS. 2 and 3, and is similarly provided with a smooth-walled axial passage 172 extending entirely therethrough. The spheroidal member 170 in the system shown in FIGS. 4, 5 and 6 is preferably of copper construction, although brass or steel may be found to be suitable.

Slidable support for the float member 170 during ascent and descent within suction accumulator 116 is provided by relatively small diameter tubular member 80. The member 80 is received at one end in hole or aperture 132a in top cap on closure 132, and is fixedly secured to the top cap by welding or other suitable techniques. The opposite end of the tubular member 80 is sealed by cap means 80a. Preferably, the extent of vertical travel of the float member 170 upon the tubular member 80 is limited by upper and lower ring members 82 and 84, respectively, welded or otherwise secured to member 80. It is believed now quite apparent that the tubular guide member 80 and passage 172 in the float member 170 are so sized diametrally relative to one another so that there is a loose fit therebetween, and that the float member 170 accordingly travels upon the supporting guide member 80 essentially friction-free. Buoyancy of the float member upon the refrigerant within the accumulator casing 130 provides the requisite vertical movement.

Supported in any suitable manner upon the inner circumference of the metallic float member 170 is magnetic means 180, and operatively associated therewith is magnetic switch means generally indicated by the numeral 182. As is best shown in FIG. 6, the magnetic switch means 182 in the exemplary form shown comprises an open-ended tubular sleeve member 182a of a suitable plastic material mounting at one end rubber bushing means 182b receiving therethrough a plurality of wires 184 electrically connected to magnet means 186 interiorly of sleeve member 182a. Sleeve member 182 is freely received in tubular guide member 80, with bushing means 182b in press fit relation with cap members 132 through hole or opening 132a therein. It is to be noted that by constructing and arranging the magnetic switch means 182 as shown and described, replacement thereof, if needed, can readily be accomplished.

Cap member 132 may have attached thereto a metal tag 190 (FIG. 4), earlier noted as provided for the purpose of preventing reverse connection of the suction accumulator 16, thereby avoiding damage to the compressor 12.

In the operation of the embodiment of the invention shown in FIGS. 4, 5 and 6, and described hereinabove, as the refrigerant level within the suction accumulator casing 130 rises, float member 170 is caused to travel upwardly upon the tubular support member 80, being guided thereby. As magnet means 180 interiorly of float member 170 becomes aligned generally horizontally with magnet means 186 of magnetic switch means 182, the electromagnetic force generated thereby activates an audible and/or visual signal, alerting attending personnel to take remedial action. As an alternative, the magnetic switch means 182 may be electrically connected to compressor 12, causing the same to be shut down and the refrigeration system 10 thereby inactivated.

It is believed now apparent that by proceeding in accordance with the novel concepts of this invention, the possibility of compressor damage occasioned by a major flood back of the suction accumulator is rendered essentially remote. Various changes and modifications to the systems herein disclosed have been noted, and these and other variations may of course be practiced without departing from the spirit of the invention or the scope of the subjoined claims.

I claim:

1. A suction accumulator for a compressor of a refrigeration system, comprising a tubular casing having closure means secured to the opposite ends thereof, inlet and outlet tubes extending within said casing and secured to one of said closure means through openings provided therein, a stand pipe secured to said one closure means and located within said casing in axially spaced relation with said outlet tube, said stand pipe adjacent one end thereof having at least one opening therein and at the opposite end thereof mounting cap means spaced from the other of said closure means and having a metering orifice formed therein, and a float member disposed in surrounding relation to said stand pipe and freely slidable thereon in direct contact therewith in response to the level of refrigerant in said accumulator, said float member being effective upon occasion of a major flood back of the suction accumulator to block the opening in said stand pipe, preventing thereby refrigerant flow to said compressor in an amount sufficient to cause damage thereto.

2. A suction accumulator as defined in claim 1, in which said float member is of general spheroidal shape, and moves upon a substantial portion of the axial length of said stand pipe in response to the level of refrigerant in said accumulator.

3. A suction accumulator as defined in claim 1, in which said outlet tube is of lesser diameter than said stand pipe, providing thereby space within said stand pipe for the flow of gaseous material therethrough.

4. A suction accumulator as defined in claim 1, in which means are provided on said stand pipe for limiting the extent of movement of said float member thereon.

* * * * *